United States Patent
Conn et al.

(10) Patent No.: US 6,244,497 B1
(45) Date of Patent: Jun. 12, 2001

(54) METHOD FOR SOLDERING ALUMINUM AND SOLDERING ROD THEREFOR

(75) Inventors: Paul Joseph Conn, Grand Island; Jackson H. Bowling, Jr., Orchard Park, both of NY (US)

(73) Assignee: S.A. Day Mfg. Co. Inc., Buffalo, NY (US)

(*) Notice: Subject to any disclaimer, the term of this patent is extended or adjusted under 35 U.S.C. 154(b) by 0 days.

(21) Appl. No.: 09/503,697

(22) Filed: Feb. 14, 2000

Related U.S. Application Data

(62) Division of application No. 08/972,295, filed on Nov. 18, 1997, now Pat. No. 6,070,789.

(51) Int. Cl.[7] .............................. B23K 31/00; B23K 35/00
(52) U.S. Cl. ...................... 228/119; 228/246; 228/248.1; 228/224
(58) Field of Search .................................... 228/56.3, 119, 228/121, 246, 248.1, 262.51, 41, 224, 223, 214; 29/840–860, 832; 148/24

(56) References Cited

U.S. PATENT DOCUMENTS

| | | | |
|---|---|---|---|
| 2,052,740 | * | 9/1936 | Barber et al. . |
| 2,845,700 | * | 8/1958 | Bagno . |
| 3,169,048 | * | 2/1965 | McGinn . |
| 3,736,653 | * | 6/1973 | Maierson et al. . |
| 4,097,266 | * | 6/1978 | Takahashi et al. . |
| 5,547,517 | * | 8/1996 | Iwai . |
| 5,573,602 | * | 11/1996 | Banerji et al. . |
| 5,962,133 | * | 10/1999 | Yamaguchi et al. . |
| 6,070,321 | * | 6/2000 | Brofman et al. . |
| 6,087,597 | * | 7/2000 | Shimada et al. . |

FOREIGN PATENT DOCUMENTS

WO97/00753 * 1/1997 (WO) .

* cited by examiner

*Primary Examiner*—Tom Dunn
*Assistant Examiner*—Jonathon Johnson
(74) *Attorney, Agent, or Firm*—Gary M. Hartman; Domenica N. S. Hartman

(57) ABSTRACT

A method for repairing and joining aluminum alloy articles and structures, such as heat exchangers for use in automotive applications. The method utilizes a flux-coated soldering rod (10) that is used to deliver a solder alloy (12) and a flux compound to a region to be repaired. The flux compound has a higher melting temperature than the solder alloy (12), and is present as a coating (14) that sufficiently thermally insulates the alloy (12) to cause the flux compound and the solder alloy (12) to melt nearly simultaneously during the soldering operation. The solder alloy (12) is preferably a zinc-aluminum alloy, while the flux coating (14) preferably contains a cesium-aluminum flux compound such as potassium cesium tetrafluoroaluminate, dispersed in an adhesive binder that will readily volatilize or cleanly burn off during the soldering operation. The flux compound and binder form a hard coating (14) that tenaciously adheres to the solder alloy (12) and thermally insulates the solder alloy (12) until the flux compound melts during the soldering operation. By controlling the relative amounts of preferred flux compounds and binders, the flux coating (14) remains protective and thermal-insulating on the alloy (12) until melting of the flux compound begins.

10 Claims, 1 Drawing Sheet

METHOD FOR SOLDERING ALUMINUM AND SOLDERING ROD THEREFOR

This application is a divisional application of U.S. patent application Ser. No. 08/972,295, filed Nov. 18, 1997 now U.S. Pat. No. 6,070,789.

BACKGROUND OF THE INVENTION

1. Field of the Invention

The present invention generally relates to methods for joining and repairing articles formed from aluminum and aluminum alloys, such as the repair of heat exchangers used as engine radiators and air conditioning condensers. More particularly, this invention relates to a repair technique that entails the use of a soldering rod whose composition facilitates the repair of aluminum articles in an open atmosphere.

2. Description of the Prior Art

Heat exchangers are routinely employed within the automotive industry, such as in the form of radiators for cooling engine coolant, condensers and evaporators for use in air conditioning systems, and heaters. In order to efficiently maximize the amount of surface area available for transferring heat between the fluid within the heat exchanger and the environment, the design of the heat exchanger is typically of a tube-and-fin type containing a number of tubes which thermally communicate with fins. The fins enhance the ability of the heat exchanger to transfer heat from the fluid to the environment, or vice versa. Increasingly, heat exchangers used in the automotive industry are being formed from aluminum alloys so as to help reduce the weight of automobiles. Furthermore, the trend in the industry is to form aluminum alloy heat exchangers by a brazing operation, wherein the individual components of the heat exchanger are permanently joined together with a braze alloy such as Al-Si, whose solidus temperature is lower than that of the aluminum alloy being brazed. Brazing temperatures are generally considered to be about 569° C. and above, in contradistinction to soldering which is generally performed at about 425° C. and below.

One brazing technique which has become accepted by the automotive industry requires a furnace operation in an inert atmosphere. Prior to brazing, the surfaces of the components are coated with a flux mixture that, upon melting, cracks and displaces the aluminum oxide layer that naturally forms on aluminum and aluminum-containing alloys, such that the brazeability of the braze alloy is enhanced. Accordingly, flux compounds are selected so as to melt at a lower temperature than the braze alloy used, e.g., about 10° C. to about 100° C. lower than the solidus temperature of the braze alloy, such that the flux is able to displace the aluminum oxide layer prior to melting and flowing of the braze alloy. A conventional flux mixture consists of a flux compound suspended in water, with a widely used flux being potassium fluoroaluminate complexes, as disclosed in U.S. Pat. Nos. 3,951,328 and 3,971,501 to Wallace et al. and Cooke, respectively, as well as U.S. Pat. No. 5,242,669 to Flor and Conn assigned to the assignee of the present invention, and others. Other flux compounds finding use include cesium fluoroaluminate complexes, as disclosed in U.S. Pat. No. 5,360,158 to Conn et al., assigned to the assignee of the present invention, and U.S. Pat. Nos. 4,655,385 and 4,689,092 to Suzuki et al. Cesium fluoroaluminate complexes generally have lower melting temperatures (e.g., about 450° C.) than potassium fluoroaluminate complexes (e.g., about 560° C.), which allows for the use of braze alloys with lower solidus temperatures. After depositing the flux mixture, the assembly is dried to evaporate the water, leaving only the powdery flux solids on all of the external surface of the assembly. Brazing is then performed by heating in the inert furnace atmosphere, upon which the flux compound melts and displaces the aluminum oxide on the surfaces to be brazed, followed soon after by melting and flowing of the braze alloy onto the surfaces being joined.

A disadvantage with the conventional use of flux compounds suspended in water is the general inability to consistently deposit these flux mixtures on a limited region of the components being coated. In addition, after evaporation of the aqueous solvent, the flux has a particulate shape which does not adhere well to the surfaces of the heat exchanger. Subsequent handling and assembly of the heat exchanger causes sufficient agitation to shake loose a portion of the flux particles from the heat exchanger surface. Another shortcoming is that during brazing, it is extremely important that the furnace atmosphere have a dewpoint of about −40° F. or below and a free oxygen level of about 100 parts per million or less in order to minimize oxidation of aluminum during the brazing cycle.

Methods for repairing aluminum components such as heat exchangers are also complicated by the above-noted circumstances. Particularly difficult are repairs that must be performed outside a brazing furnace, as is the case with most field repairs. While torch brazing is possible, particularly with cesium fluoroaluminate fluxes, the ability to provide an adequate amount of flux at the brazing site and the high temperatures required for brazing render field repairs very difficult. As a result, successful torch brazing outside an inert atmosphere furnace generally requires a specially formulated brazing paste such as that disclosed in U.S. Pat. No. 5,226,974 to Conn, assigned to the assignee of the present invention. The high temperatures of the brazing operation can also be detrimental to nearby regions or structures, such as the fins of a heat exchanger, which can be damaged or distorted during repairs performed at brazing temperatures.

From the above, it is apparent that it would be desirable to provide an improved method for repairing aluminum articles and structures, such as by simplifying how the flux and alloy are delivered to the site being repaired and by reducing the temperature necessary to perform the repair.

SUMMARY OF THE INVENTION

It is an object of this invention to provide a method for joining and repairing articles and structures formed from aluminum or aluminum-containing alloys, such as an automotive heat exchanger.

It is another object of this invention that such a method utilizes an alloy rod enveloped by a flux coating that eliminates the requirement for depositing a flux compound on surfaces to be joined/repaired.

It is yet another object of this invention that the alloy rod has a solidus temperature of not greater than about 430° C., so as to reduce the temperature required to perform the repair below conventional brazing temperatures.

It is still another object of this invention that the flux coating tenaciously adheres to the alloy rod, so as to permit handling the rod without significant loss of flux.

It is a further object of this invention that the flux coating contains a flux compound having a higher melting temperature than the alloy rod, and that the flux coating insulates the alloy rod during heating so as to cause the alloy rod and the flux compound to melt almost simultaneously during the repair/joining operation.

In accordance with a preferred embodiment of this invention, these and other objects and advantages are accomplished as follows.

According to the present invention, a method is provided for repairing and joining articles and structures formed from aluminum and aluminum-containing alloys, hereinafter generally referred to as aluminum alloys. Notable examples of such articles and structures include heat exchangers suitable for use in automotive applications, including condensers for air conditioning systems. The method utilizes a flux-coated soldering rod that is used to deliver a solder alloy and a flux compound to a region to be repaired or joined. Contrary to the prior art practice of using a flux compound that melts at a temperature below that of the alloy used, the method of this invention involves the use of a flux compound that has a higher melting temperature than the alloy it coats. Importantly, the flux coating is sufficiently thick on the rod to thermally insulate the alloy so that the flux compound and the solder alloy melt substantially simultaneously or immediately one after the other when heated above the melting temperature of the flux compound. Surprisingly, such near-simultaneously melting of the flux compound and solder alloy has been determined to promote the ease with which repairs can be performed without an inert atmosphere, as is the case where a field repair is to be performed. A key advantage is that, because the hard flux coating physically encases and insulates the rod, rod alloys having solidus temperatures below the melting temperature of the flux compound can be used, enabling a repair process that can be performed at temperatures near or below the conventionally-accepted minimum brazing temperature of 425° C.

The flux-coated soldering rod of this invention generally includes a solder alloy, such as a zinc-aluminum alloy, which is generally formed in the shape of a rod. The rod is covered by the flux coating containing particles of a suitable flux compound, preferably a cesium-aluminum flux compound such as potassium cesium tetrafluoroaluminate, dispersed in an adhesive binder that will readily volatilize or cleanly burn off during the soldering operation. Importantly, the flux compound and binder must be capable of forming a hard coating that tenaciously adheres to the rod alloy and thermally insulates the rod until the flux compound melts during the soldering operation. According to this invention, by controlling the relative amounts of certain preferred flux compounds and binders, a flux coating is produced that remains protective and thermal-insulating on the rod until melting of the flux compound begins, at which time the flux compound and rod melt substantially simultaneously or in rapid succession.

Those skilled in the art will appreciate that the soldering rod of this invention is particularly useful in repairing aluminum alloy articles and structures as well as joining such articles and structures. The invention is particular directed to repair techniques which are unlikely to be performed in an inert atmosphere of a brazing furnace. Because the flux coating is hard and tenaciously adheres to the soldering rod, the soldering rod can be handled without significant loss of the flux compound. Use of the soldering rod generally entails placing the rod near the region to be repaired, and heating the surface and the soldering rod by any suitable means.

During heating, the rod alloy, having a solidus (melting) temperature lower than the flux compound, is sufficiently insulated by the flux coating so as not to melt when the temperature of the flux coating reaches the solidus temperature of the rod alloy. Further heating eventually results in melting of the flux compound, which is immediately followed by or occurs substantially simultaneously with the melting of the rod alloy, causing a stream of molten flux and solder alloy to be delivered in controlled amounts that provide for dislocation of aluminum oxide on the repair surface and immediate coating of the surface with the molten solder alloy.

From the above, it can be seen that an advantage of the present invention is that the above method and soldering rod enable the repair of aluminum alloy articles and structures without the temperatures and inert atmosphere required of conventional brazing processes. As such, repairs can be more readily performed in the field. This advantage of the invention is attributable to the type of flux compound and solder alloy used, particularly the use of a flux compound having a melting temperature above that of the alloy used, which is contrary to prior art practice. This advantage is also attributable to the manner in which the flux compound is coated on the solder alloy rod, which yields a hard, tenaciously adherent coating that maintains a thermally-insulating barrier on the surface of the rod during heating until melting of the flux compound occurs. That this type of flux-solder delivery is successful is unexpected in view of the prior art practice of requiring a flux compound that melts 10° C. to 100° C. below the solidus temperature of a braze alloy used, in order to assure that the flux is able to displace the aluminum oxide layer on the surface being joined or repaired prior to melting and flowing of the braze alloy. Also unexpected is that a flux coating could adequately insulate the rod and remain sufficiently cohesive to permit heating by such methods as a torch to the extent that the lower-melting rod does not melt prior to the flux.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing, which shows a cross-sectional view of a flux-coated soldering rod in accordance with this invention.

DETAILED DESCRIPTION OF THE PREFERRED EMBODIMENT

Figure 1:
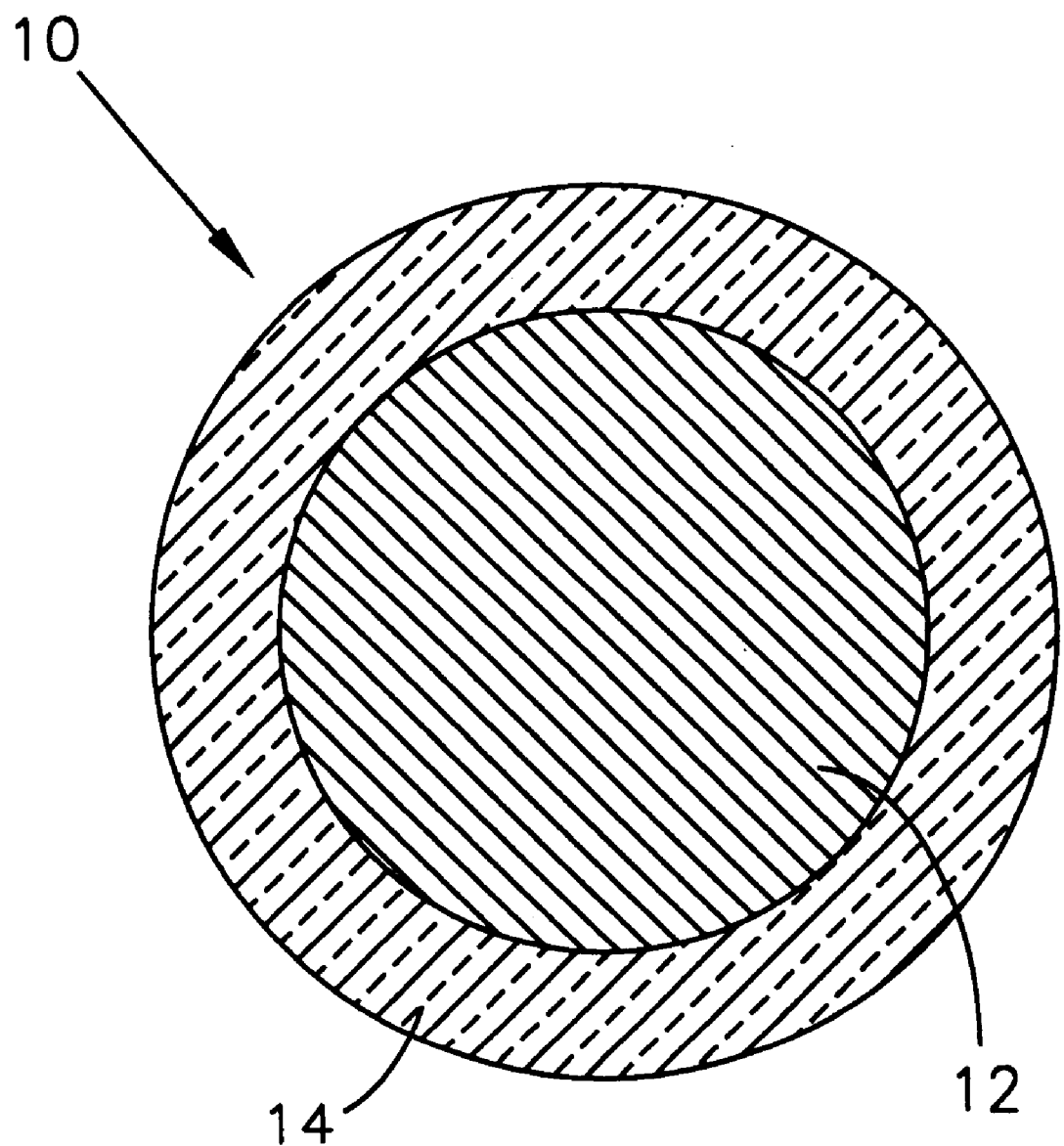

An improved method is provided for repairing aluminum alloy articles and structures, such as automotive heat exchangers including condensers used in automobile air conditioning systems. The method of the present invention is a soldering or low-temperature brazing operation that utilizes a soldering rod coated with a hard thermally-insulating flux coating. Importantly, the flux coating contains a flux compound having a higher melting temperature than the alloy of the soldering rod, and is present in a sufficient amount to maintain a thermal-insulating barrier around the rod until the flux compound melts, after which both the flux compound and alloy melt either simultaneously or in rapid succession. The relative amounts of flux compound and solder alloy present within the soldering rod are also at levels that ensure adequate dislocation of aluminum oxides on the repair surface for the amount of solder alloy being delivered with the flux compound to the surface.

While the present invention will be discussed in reference to the repair of heat exchangers formed of aluminum alloy components, those skilled in the art will recognize that the teachings of this invention are generally applicable to the joining and repair of aluminum alloy components.

Shown in cross-section in FIG. 1 is a flux-coated soldering rod 10 of the present invention. The soldering rod 10 is adapted for the repair of aluminum and aluminum alloys, examples of which include aluminum-silicon alloys AA 4045, 4047 and 4343 (AA designating the Aluminum Association) used widely to form components of heat exchangers. These alloys have solidus (melting) temperatures in the range of about 588° C. to about 621° C., near and above which a repair operation cannot be performed. In the past, repairs have been generally performed at brazing temperatures, typically about 577° C. or greater, as a result of the requirement that the repair alloy used have a solidus temperature above the melting temperature of the flux compound used. For example, potassium fluoroaluminate fluxes generally have melting temperatures of about 560° C., while cesium fluoroaluminate complexes generally have melting temperatures on the order of about 450° C., necessitating the use of braze alloys such as Al—Si alloys, whose solidus temperatures are generally about 570° C. or higher. In contrast to the prior art, the present invention employs a repair operation that utilizes a soldering rod configured to use a solder alloy in combination with a flux compound having a melting temperature higher than the solidus temperature of the solder alloy. By use of the terms "solder" and "soldering," the present invention is intended to be distinguished from prior joining and repair operations that occur well within conventional brazing temperatures.

The flux-coated solder rod 10 is shown in FIG. 1 as having a core formed by a rod 12 of a suitable solder alloy, onto which a flux-containing material is applied so as to form a flux coating 14 that covers the entire circumferential surface of the rod 12. More specifically, the flux coating 14 is deposited on the rod 12 such that the coating 14 provides a continuous thermal-insulating barrier around the rod 12. According to this invention, the composition and thickness of the flux coating 14 must be sufficient to insulate the rod 12 during heating, such that the rod 12 does not melt until after the flux coating 14 has melted, at which time the rod 12 melts substantially simultaneously with the coating 14 or immediately thereafter. While the prior art relied on the use of flux compounds having melting temperatures lower that than of the alloys with which they were used in order to dislocate aluminum oxide on a surface prior to application of the molten alloy, investigations leading to the present invention unexpectedly showed that the near simultaneous melting of the solder alloy rod 12 and the flux coating 14 provided a sufficient cleansing action by the flux compound of the flux coating 14. Furthermore, and as is apparent from FIG. 1, the soldering rod 10 can be readily formed to contain predetermined amounts of flux compound and solder alloy that can be readily placed at a region to be repaired, thereby providing the solder alloy required to form the repair as well as the flux compound required to enhance the solderability of the region being repaired.

According to this invention, suitable solder alloys include Zn—Al alloys, particularly those containing about 1 to about 10 weight percent aluminum and the balance zinc and incidental impurities, with a preferred solder alloy being 98Zn—2Al. As a solder alloy, such Zn—Al alloys have a solidus (melting) temperature well below that of the aluminum alloy to be repaired, such that the soldering operation can be performed without an adverse structural or metallurgical effect on the aluminum alloy. The solidus temperature of a suitable solder alloy is not higher than about 521° C., while more preferred solder alloys have solidus temperatures below about 430° C. The preferred 98Zn—2Al alloy has a solidus temperature of about 379° C. and flows at about 385° C., and is therefore compatible with conventional soldering temperatures. The rod 12 is preferably formed as an extrusion of the solder alloy.

As is known in the art, flux compounds are reactive to remove aluminum oxide only when at least partially molten, such that flux compounds suitable for the flux coating 14 of this invention must be partly or wholly molten at a temperature well below the solidus temperature of the surface being repaired. However, according to this invention, suitable flux compounds must also have a melting temperature above the solidus temperature of the solder alloy that forms the rod 12, while being capable of providing a thermal insulating effect that prevents the solder alloy from melting until the flux coating 14 melts. Preferred flux compounds for the flux coating 14 are cesium-aluminum (Cs—Al) fluxes having a melting temperature of at least about 45° C. above the solidus temperature of the solder alloy for the rod, though flux compounds having lower melting temperatures relative to the rod alloy could foreseeably be used if their melting temperatures and the heating process are such that the rod 12 melts simultaneously or soon after the flux coating 14 in accordance with this invention. The flux compound preferably constitutes about 30 to about 87 weight percent of the mixture, the balance of the mixture being adhesive binder and solvent.

A preferred flux coating 14 is formed by combining potassium cesium tetrafluoroaluminate ($KCsAlF_4$) with a suitable water- or alcohol-soluble adhesive binder, which then can be applied to the rod 12 and dried to evaporate the solvent to yield the hard, adherent coating 14. The preferred potassium cesium tetrafluoroaluminate compound is preferably a mixture of potassium tetrafluoroaluminate and cesium tetrafluoroaluminate in relative amounts to lower the melting temperature of the flux compound to temperatures at or near conventional soldering temperatures. A preferred ratio is about three parts potassium tetrafluoroaluminate to about one part cesium tetrafluoroaluminate, which yields a flux compound having a melting temperature of about 430° C. Potassium cesium tetrafluoroaluminate is also desirable for the flux compound in that it forms a non-corrosive, glassy, ceramic residue that is not detrimental to the surface of an aluminum alloy. In addition, this flux compound is capable of cracking and displacing the aluminum oxides at soldering temperatures while remaining essentially inert with respect to aluminum at such temperatures.

The particle size of the flux compound within the coating 14 is preferably about 25 to about 40 micrometers so as to be able to form a substantially smooth flux coating 14 on the rod 12. In addition, the purity of the flux component should be a minimum of about 96 weight percent tetrafluoroaluminate, $AlF_4$, as the presence of $AlF_3$ or $AlF_6$ within the flux compound may tend to be too reactive and corrosive.

Preferred adhesive binders for the flux coating 14 of this invention include acrylic copolymer emulsions such as urethane or a water-soluble acrylic. Other suitable binders include natural resins such as water-white rosin or gum lac, as well as other alcohol-soluble and water-insoluble natural resins. These binders are suitable because they are capable of cleanly volatilizing or burning off before the flux coating 14 and the rod 12 melt. Alternatively, a water-soluble epoxy resin can be used for the binder in the flux coating 14. Such epoxy resins are well known and commercially available, and can be used in the same proportions relative to the flux compound as the previously-noted binders. Used at these ratios, water-soluble epoxy resins have exhibited excellent properties in terms of their volatility at the temperatures employed by the method of this invention, as well as their ability to hold the flux compound in a cohesive state while being applied to the rod 12 and thereafter yield the desired hard flux coating 14 of this invention.

Prior to forming the flux coating 14, the preferred flux compound is dispersed in the binder. Where the binder is one of the preferred acrylic copolymer emulsions, the binder is first dissolved in water at a ratio of roughly 1:1, more preferably about 40% binder and about 60% water. The preferred quantity of water for a particular application used will depend upon the type and consistency of the flux compound. Specifically, the amount of water used must allow the flux-binder mixture to be sufficiently viscous so as to provide the desired cohesive action between the flux compound and the rod 12, while also being sufficiently fluid so as to permit easy and consistent application of the flux-binder mixture on the rod 12. The amount of water used will also determine the method by which the flux-binder mixture is deposited on the rod 12. Generally, when the binder is combined with water at a 1:1 ratio, the handling characteristics of the solution with the addition of the flux compound will be such that the resulting flux-binder mixture is very viscous, enabling the mixture to be applied to the rod 12 by casting, brushing and immersion techniques. A particularly suitable flux-binder mixture contains, by weight, about 17.7% acrylic copolymer emulsion, about 24.1% water, with the balance being the preferred flux compound. Following deposition and evaporation of the water, this flux coating 14 contains essentially the flux compound and binder at a ratio of roughly 3:1.

The binder serves to hold the flux compound in a cohesive state while it is being applied to the rod 12 and thereafter until the water or alcohol is evaporated. Afterwards, the binder and flux compound form the hard flux coating 14 that enables the soldering rod 10 to be handled either by hand or with conventional handling equipment without concern for the loss of significant amounts of the flux compound or the flux coating 14 itself. The binder ensures that the flux coating 14 will tenaciously adhere to the rod 12 until the soldering rod 10 is sufficiently heated to melt both the flux coating 14 and the rod 12.

The diameter and length of the flux-coated soldering rod 10 will generally depend on the particular application. The cross-section of the soldering rod 10 may also vary in accordance with the particular requirements of an application. Generally, 98Zn—2Al rods having a diameter of about 1.6 millimeters have been determined to be well suited for repairing a condenser of an automobile air conditioning system. A thickness of about 0.08 to about 0.5 millimeters has been determined to be sufficient for the flux coating 14 on a 1.6 millimeter 98Zn—2Al rod 12 in order to provide both the desired thermal-insulating effect for the rod 12 and a sufficient cleansing action to enhance solderability. As will be apparent to those skilled in the art, the amount of flux compound delivered with the solder alloy must be sufficient to deoxidize and wet a surface being repaired. Accordingly, it is entirely foreseeable that the amount of rod 12 and coating 14 could vary widely in order to perform suitably for a given application, though the relative amounts must be controlled in order to ensure that the flux coating 14 is able to perform both its insulating and deoxidizing roles, and the solder alloy will melt simultaneously with or immediately after the flux coating 14.

Using the soldering rod 10 of this invention, the solder repair of an aluminum alloy article or structure can be performed in air, i.e., without an inert atmosphere. The surface to be repaired and the soldering rod 10 are gradually heated to the melting temperature of the flux compound, which again is above the solidus (melting) temperature of the rod 12. While the exterior of the rod 10 is between the melting temperatures of the rod 12 and flux compound 14, the flux coating 14 maintains sufficient integrity to thermally insulate the rod 12 and thereby prevent the rod 12 from melting. At this time, a significant portion of the binder has already volatilized or burned off. Upon melting of the flux compound, the rod 12 also melts, such that the flux compound and the solder alloy are simultaneously delivered to the repair site, with the flux compound providing the cleansing action necessary to enhance the solderability of the surface being repaired. Upon cooling, the solder alloy solidifies to form a solder repair that bonds to the surface of the aluminum alloy article.

While our invention has been described in terms of a preferred embodiment, it is apparent that other forms could be adopted by one skilled in the art. Accordingly, the scope of our invention is to be limited only by the following claims.

What is claimed is:

1. A method for soldering an aluminum alloy member, the method comprising the steps of:

forming a flux-coated soldering rod comprising a core formed from an alloy having a solidus temperature less than the aluminum alloy member, and a flux coating adhered to the core so as to form a substantially dry and solid coating on the core, the flux coating comprising a Cs—Al flux compound dispersed in an adhesive binder, the flux compound having a melting temperature above the solidus temperature of the core, the flux coating being sufficiently thick on the core so as to thermally insulate the core and thereby delay the core from melting at a temperature above the solidus temperature of the core but below the melting temperature of the flux compound, and subsequently enable the flux coating and core to melt substantially simultaneously upon heating above the melting temperature of the flux compound;

positioning the flux-coated soldering rod adjacent the aluminum alloy member;

heating the flux-coated soldering rod to a temperature above the solidus temperature of the core but below the melting temperature of the flux compound, during which the flux coating and the core do not melt; and then further heating the flux-coated soldering rod to a temperature above the melting temperature of the flux compound, the flux coating thermally insulating the core until the flux compound melts at which time the core also melts.

2. A method as recited in claim 1, wherein the melting temperature of the flux compound is at least 45° C. above the solidus temperature of the core.

3. A method as recited in claim 1, wherein the alloy of the core is a Zn—Al alloy comprising at least about 90 weight percent zinc and up to about 10 weight percent aluminum.

4. A method as recited in claim 3, wherein the Zn—Al alloy is essentially 98 weight percent zinc and 2 weight percent aluminum.

5. A method as recited in claim 1, wherein the flux coating is formed by depositing on the core a flux-binder mixture comprising about 30 to about 87 weight percent of the flux compound and the balance a combination of the adhesive binder and a solvent.

6. A method as recited in claim 1, wherein the adhesive binder is chosen from the group consisting of alcohol-soluble natural resins, water-soluble epoxy resins, and acrylic copolymer emulsions.

7. A method as recited in claim 1, wherein the flux coating comprises about three parts of the flux compound and about one part of the adhesive binder.

8. A method as recited in claim 1, wherein the flux compound is potassium cesium tetrafluoroaluminate.

9. A method as recited in claim 8, wherein the flux compound consists essentially of about three parts potassium tetrafluoroaluminate to about one part cesium tetrafluoroaluminate.

10. A method for repairing an aluminum alloy member, the method comprising the steps of:

forming a flux-coated soldering rod comprising a core formed from a Zn—Al alloy containing at least 90 weight percent zinc and having a solidus temperature less than the aluminum alloy member, and a flux coating adhered to the core so as to form a substantially dry and solid coating on the core, the flux coating being formed from a flux-binder mixture comprising about 30 to about 87 weight percent of a flux compound with the balance being an adhesive binder and solvent, the flux compound consisting essentially of about three parts potassium tetrafluoroaluminate to about one part cesium tetrafluoroaluminate, the adhesive binder being chosen from the group consisting of alcohol-soluble natural resins, water-soluble epoxy resins, and acrylic copolymer emulsions, the flux compound having a melting temperature of at least 45° C. above the solidus temperature of the core, the flux coating being sufficiently thick on the core so as to thermally insulate the core and thereby enable the flux compound and core to melt substantially simultaneously upon heating;

positioning the flux-coated soldering rod adjacent the aluminum alloy member; and heating the flux-coated soldering rod and the aluminum alloy member to a temperature above the melting temperature of the flux compound, the flux coating thermally insulating the core until the flux compound melts at which time the core also melts.

* * * * *